(12) United States Patent
Delpech

(10) Patent No.: US 8,874,352 B2
(45) Date of Patent: Oct. 28, 2014

(54) METHOD OF CONTROLLING THE COMBUSTION PHASE OF A FUEL MIXTURE OF A SPARK-IGNITION SUPERCHARGED INTERNAL-COMBUSTION ENGINE, NOTABLY OF GASOLINE TYPE

(75) Inventor: Vivien Delpech, Estrablin (FR)

(73) Assignee: IFP Energies Nouvelles, Cedex (FR)

( * ) Notice: Subject to any disclaimer, the term of this patent is extended or adjusted under 35 U.S.C. 154(b) by 532 days.

(21) Appl. No.: 13/177,653

(22) Filed: Jul. 7, 2011

(65) Prior Publication Data
US 2012/0016567 A1    Jan. 19, 2012

(30) Foreign Application Priority Data
Jul. 13, 2010   (FR) ..................... 10 02959

(51) Int. Cl.
| | | |
|---|---|---|
| B60T 7/12 | (2006.01) | |
| F02D 41/00 | (2006.01) | |
| F02D 35/02 | (2006.01) | |
| F02D 19/10 | (2006.01) | |
| F02D 19/08 | (2006.01) | |
| F02D 19/12 | (2006.01) | |
| F02D 19/06 | (2006.01) | |

(52) U.S. Cl.
CPC .............. *F02D 19/105* (2013.01); *Y02T 10/36* (2013.01); *F02D 41/0007* (2013.01); *F02D 35/028* (2013.01); *F02D 41/0027* (2013.01); *F02D 19/0692* (2013.01); *F02D 35/023* (2013.01); *F02D 19/0636* (2013.01); *F02D 19/0623* (2013.01); *F02D 19/0647* (2013.01); *F02D 41/0025* (2013.01); *F02D 19/081* (2013.01); *Y02T 10/144* (2013.01); *F02D 35/027* (2013.01); *F02D 19/12* (2013.01)
USPC .. 701/105; 123/575; 123/406.22; 123/406.45

(58) Field of Classification Search
CPC ...... F02D 41/401; F02D 35/023; F02D 37/02
USPC .......... 701/103–105, 110, 111; 123/575, 576, 123/198 A, 434, 435, 698, 406.11, 406.16, 123/406.17, 406.22, 406.41, 406.45, 123/406.47, 406.58
See application file for complete search history.

(56) References Cited

U.S. PATENT DOCUMENTS

| | | | | |
|---|---|---|---|---|
| 4,896,642 | A | * | 1/1990 | Washino et al. .......... 123/406.42 |
| 4,984,546 | A | * | 1/1991 | Shimomura et al. ...... 123/406.23 |
| 5,027,775 | A | * | 7/1991 | Iwata ....................... 123/406.21 |
| 2003/0188714 | A1 | * | 10/2003 | Yamamoto et al. ........... 123/435 |
| 2007/0084442 | A1 | * | 4/2007 | Nakagawa et al. ...... 123/406.27 |
| 2008/0060627 | A1 | | 3/2008 | Bromberg et al. |
| 2009/0076705 | A1 | | 3/2009 | Colesworthy et al. |
| 2010/0094528 | A1 | * | 4/2010 | Auclair et al. ................ 701/111 |

FOREIGN PATENT DOCUMENTS

WO    WO 83/03120    9/1983

* cited by examiner

*Primary Examiner* — John Kwon
(74) *Attorney, Agent, or Firm* — Antonelli, Terry, Stout & Kraus, LLP.

(57) ABSTRACT

The present invention relates to a method of controlling the combustion phase of a fuel mixture of a spark-ignition supercharged internal-combustion engine comprising at least one cylinder (12) with a combustion chamber (14), at least one fuel supply means (48, 52) and spark ignition means (38).
According to the invention, the method consists, for high loads and low speeds of said engine, in determining, during the combustion of the fuel mixture, the value of crank angle (θ') where the maximum cylinder pressure ($P_{max}$) occurs in the combustion chamber; in comparing the value thus determined with a maximum angle threshold value ($θ_{max}$) representative of an abnormal combustion in said chamber; in detecting the start of an abnormal combustion when the determined value reaches said threshold value and when the ignition means are not actuated; and in feeding an amount of another fuel into the fuel mixture in order to modify the energy index of this mixture so as to reduce the crank angle where the maximum cylinder pressure occurs.

12 Claims, 1 Drawing Sheet

METHOD OF CONTROLLING THE COMBUSTION PHASE OF A FUEL MIXTURE OF A SPARK-IGNITION SUPERCHARGED INTERNAL-COMBUSTION ENGINE, NOTABLY OF GASOLINE TYPE

FIELD OF THE INVENTION

The present invention relates to a method of controlling the combustion phase of a fuel mixture of a spark-ignition supercharged internal-combustion engine, notably of gasoline type.

It more particularly relates to such an engine with indirect fuel injection, but it does not rule out in any way an engine with direct fuel injection.

It essentially concerns engines that have undergone downsizing. This operation is intended to reduce the size and/or the capacity of the engine while keeping the same power and/or the same torque as conventional engines.

BACKGROUND OF THE INVENTION

Generally, this type of engine comprises a combustion chamber within which a fuel mixture undergoes a compression phase, followed by a combustion phase under the effect of spark ignition means, such as a plug.

It has been observed that this fuel mixture can follow an abnormal combustion that generates mechanical and/or thermal stresses some of which can seriously damage the engine.

This abnormal combustion is essentially due to a pre-ignition (or self-ignition) of the fuel mixture before the plug initiates ignition of the mixture present in the combustion chamber.

In fact, considering the high pressures and the high temperatures reached in this combustion chamber as a result of supercharging, combustion start can occur sporadically well before the time when ignition of the fuel mixture by the plug occurs.

In cases where this abnormal combustion due to pre-ignition or self-ignition occurs suddenly, in a random and sporadic manner, it is referred to as rumble.

The latter abnormal combustion leads to very high pressure levels (of the order of 120 to 250 bars) and to a thermal transfer increase that may cause partial or total destruction of the moving elements of the engine, such as the piston or the piston rod.

Furthermore, it has been observed that this abnormal combustion takes place at high loads and generally at low engine speeds.

More precisely, this abnormal combustion appears when an ignition sub-advance is achieved as a result of circumstances linked with incipient engine knock, a phenomenon that then requires to decrease this advance and thus to increase rumble risks at low engine speed.

One solution for preventing this risk consists in limiting the maximum cylinder pressure angle so as to avoid generating temperature and pressure conditions favouring such rumble.

This solution involves the drawback of not allowing to exploit all of the performance potential of this spark-ignition engine. In fact, the load increase via the supercharging pressure generates engine knock, which requires application of a conventional ignition sub-advance. This sub-advance moves forward the combustion and therefore the maximum cylinder pressure angle that must be limited to a usual value of 35° crank angle after the TDC (combustion Top Dead Centre).

The maximum performances of the engine at low speed are thus limited to the load for which the ignition advance adjustment corresponds to these two combined criteria.

The present invention thus aims to overcome the aforementioned drawbacks by means of a combustion method allowing rumble appearance risks to be limited.

SUMMARY OF THE INVENTION

The present invention thus relates to a method of controlling the combustion phase of a fuel mixture of a spark-ignition supercharged internal-combustion engine, notably of gasoline type, wherein the engine comprises at least one cylinder with a combustion chamber, at least one fuel supply means, at least one intake means, at least one exhaust means and spark ignition means, characterized in that it consists, for high loads and low speeds of said engine:

during the combustion of the fuel mixture, in determining the value of the crank angle where the maximum cylinder pressure occurs in the combustion chamber, in comparing the value thus determined with a maximum angle threshold value representative of an abnormal combustion in said chamber, in detecting the start of an abnormal combustion when the determined value reaches said threshold value and when the ignition means are not actuated, in feeding another fuel into the fuel mixture in order to vary the global octane number of this fuel mixture so as to reduce the crank angle where the maximum cylinder pressure occurs.

The method can consist in increasing the global octane number of the fuel mixture.

The method can consist in feeding another fuel of gas type into the fuel mixture.

Advantageously, the method can consist in feeding a gaseous fuel of VNG type.

The method can consist in preparing the fuel mixture from a liquid fuel.

The method can consist in preparing the fuel mixture from a gasoline fuel.

BRIEF DESCRIPTION OF THE FIGURES

Other features and advantages of the invention will be clear from reading the description hereafter, with reference to the accompanying figures wherein.

DETAILED DESCRIPTION

Figure 1:
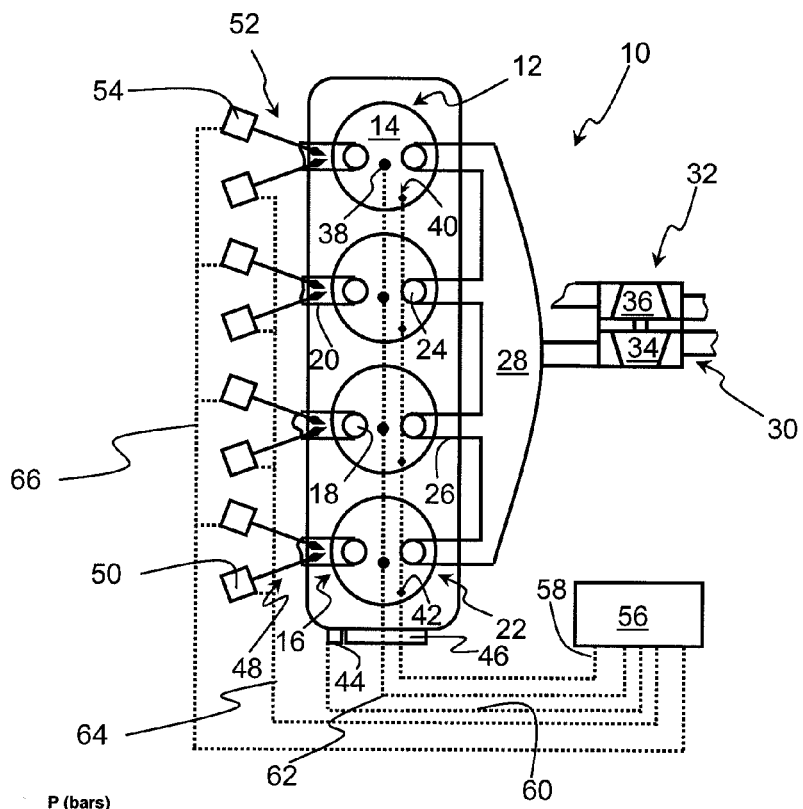
FIG. 1 shows an engine using the combustion phase control method according to the invention.

The engine illustrated in FIG. 1 is a spark-ignition supercharged internal-combustion engine 10.

This engine has the specific feature of running with a first combustion mode referred to as single carburetion, according to which a single fuel is used, or with another combustion mode, referred to as multi-carburetion, allowing several fuels of different nature to be associated.

By way of non limitative example, the fuel used for the single carburetion mode is a first liquid fuel (gasoline, ethanol, biofuel, etc.) with an anti-knock index (RON) of the order of 90 to 95 for example, which is associated, for multi-carburetion running mode, with at least another liquid or gaseous fuel (VNG (Vehicular Natural Gas), LPG (Liquefied Petroleum Gas), methane) having a higher RON than the first fuel.

For reasons of simplification of the following description, the single carburetion mentioned uses a liquid fuel of gasoline type and for the multi-carburetion, which is here a bicarburetion, the gasoline type liquid fuel is associated with a VNG type gaseous fuel.

The engine illustrated in FIG. 1 comprises at least one cylinder 12, four cylinders here, housing a piston with a reciprocating rectilinear displacement (not shown) delimiting a combustion chamber 14 within which combustion of a fuel mixture takes place.

The cylinder comprises air intake means 16 with at least one valve 18 associated with an intake pipe 20. This cylinder also comprises burnt gas exhaust means 22 with at least one exhaust valve 24 controlling an exhaust pipe 26.

Exhaust pipes 26 are connected to an exhaust manifold 28 which is in turn connected to an exhaust line 30.

A supercharging device 32, a turbocompressor for example, is arranged on this exhaust line. This turbocompressor comprises a turbine 34 scavenged by the exhaust gas circulating in the exhaust line, and a compressor 36 rotatingly connected to the turbine so as to enable compression of the outside air and to allow this intake air under pressure (or supercharged air) into intake pipes 20.

This cylinder also comprises spark ignition means 38, a spark plug for example, enabling to generate one or more sparks allowing to ignite the fuel mixture present in the combustion chamber of the cylinder.

Means 40 allowing to know the state of progress of the combustion in combustion chamber 14 are also provided. By way of example illustrated in FIG. 1, these means are a pressure detector 42 allowing to measure the evolution of the pressure in the combustion chamber, referred to as cylinder pressure. This pressure is one of the parameters representative of the state of progress of the fuel mixture combustion.

Of course, any other means allowing to know the state of progress of the combustion can be used, such as knock detection means usually arranged on the cylinder housing of the engine, such as an accelerometer that allows to generate a signal representative of vibrational waves.

In order to be able to determine the position of the piston within the cylinder, the engine also carries an angular sensor 44 arranged opposite a target 46 carried by the crankshaft (not shown) to which the piston is connected.

This cylinder also comprises first fuel supply means 48, here in form of an injector 50 for a fuel in liquid form, of gasoline type, allowing the fuel to be fed into intake pipe 20.

This cylinder also comprises second fuel supply means 52 with a gaseous fuel (VNG) injector 54 allowing the gaseous fuel to be fed into intake pipe 20.

The engine comprises a computing and control unit 56 referred to as engine calculator, allowing the operation of this engine to be controlled.

More particularly, this calculator is directly or indirectly connected by conductors to the various detectors, sondes and/or detection means (water temperature, oil temperature, pressure in the combustion chamber) the engine is provided with. The signals received are processed and the calculator then controls through control lines the components of this engine so as to ensure smooth running thereof.

As illustrated in FIG. 1 by way of example, pressure detectors 42 are connected to this calculator by a conductor 58 so as to send a signal representative of the pressure prevailing in the cylinders, angular sensor 44 is connected to this calculator by a conductor 60 so as to determine the positions of the piston during the displacement thereof, spark plugs 38 are connected by control lines 62 to the calculator so as to control the ignition time of the fuel mixture and the controls of injectors 50, 54 are connected by control lines 64, 66 to calculator 56 so as to control the fuel injection parameters, such as the amount of fuel injected or the injection time.

This calculator furthermore comprises maps or data charts allowing to evaluate the parameters required for its operation, according to the various engine running conditions, such as the engine speed or the power requested by the driver.

When this engine runs at high load and low speed (between 1000 and 2500 rpm), engine knock requires an ignition sub-advance so as to get out of this abnormal combustion mode.

Figure 2:
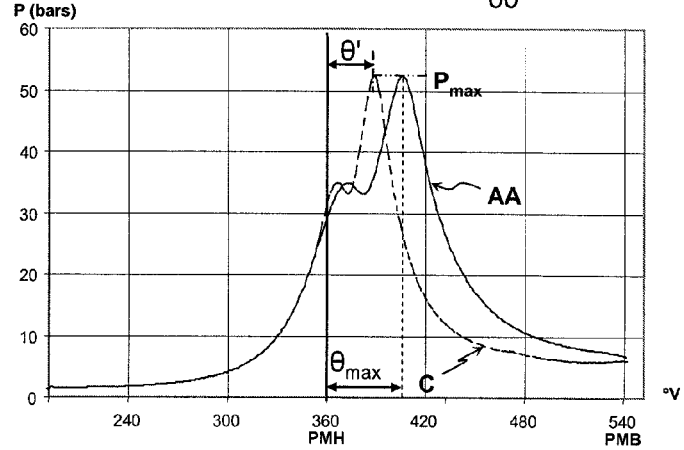
FIG. 2 shows pressure curves (P in bars) as a function of the crank angle (°V) for an engine of the prior art and for an engine using the method according to the invention.

This sub-advance moves the maximum cylinder pressure angle $\theta_{max}$ away from the top dead centre (PMH in the figure) and this angle is generally limited to a usual value of about 35 crank angle degrees after the TDC, as illustrated in FIG. 2.

In cases where this crank angle value $\theta_{max}$ is approached or exceeded, the risks as regards a rumble type abnormal combustion are increased.

In order to prevent this, the progress of the fuel mixture combustion in combustion chamber 14 is controlled.

With reference to FIG. 2, curve AA shows the conventional evolution of the cylinder pressure in combustion chamber 14 of an engine running in single carburetion mode, as a function of the crank angle (°V), after intake of the fuel mixture into this chamber.

The piston compresses the fuel mixture present in the combustion chamber to the neighbourhood of the TDC where this mixture is ignited by spark plug 38. As a result of this ignition, the cylinder pressure increases up to a value $P_{max}$ at a threshold crank angle $\theta_{max}$ of about 35° after the TDC. This cylinder pressure then decreases until the BDC is reached, where the pressure in the combustion chamber is close to atmospheric pressure.

Above this usual value of 35°, fuel mixture self-ignition risks may appear.

In fact, if the timing advance is set too late (which generates a maximum cylinder pressure angle above 35°), the pressure and temperature conditions in combustion chamber 14, just before the spark plug fires, are such that a sudden self-ignition (rumble) can occur.

This value of 35 crank angle degrees advantageously corresponds to a mean obtained from experiments on the engine test bench.

In order to limit risks of rumble type abnormal combustion appearance, it is necessary that the value of the measured crank angle of the measured maximum cylinder pressure does not exceed the set crank angle threshold value $\theta_{max}$ of this pressure.

Pressure detector 42 therefore measures the pressure in chamber 14 during the combustion phase between the TDC and the BDC, and it sends the corresponding signal through conductor 58 to the calculator.

Advantageously, this maximum angle value can first be validated on the engine test bench, which thus allows to do without the pressure detectors and the link with calculator 56.

These maps of the cylinder pressure angle as a function of the load, ignition advance, engine speed, supercharging pressure, are integrated in the calculator, thus sparing continuous use of these detectors in the vehicle.

Simultaneously, angular sensor 44 communicates the crankshaft angular position signal to this calculator that determines the position of the piston therefrom.

From these two signals (pressure and angular position), the calculator determines the value of crank angle θ' after the TDC where the maximum cylinder pressure is reached.

This determined value of angle θ' is then compared with the maximum angle threshold value $\theta_{max}$ that is representative of the maximum limit from which rumble appearance risks are high.

This threshold value is advantageously contained in the calculator data charts and, in the example described, it is around 35° after the TDC.

This allows the calculator to detect the risk of rumble type abnormal combustion start when the determined angle value approaches or reaches maximum angle threshold value $\theta_{max}$, and when this value is determined early in the cycle, i.e. before the spark plug fires.

Thus, when this threshold value is approached or even reached, the calculator controls the fuel injectors so as to switch from an engine in single carburetion mode (gasoline) to an engine in bicarburetion mode (gasoline and gas).

Concomitant injection of a second gaseous fuel, of VNG type for example, then allows to modify the global octane number of this mixture and thus to increase the knock resistance. This in turn allows to increase the load and/or the ignition advance while maintaining the maximum cylinder pressure angle below the maximum value allowed.

This second fuel affords the advantage of having self-ignition resistance characteristics (RON) that allow the combustion to be retimed by modifying the ignition advance.

Via this concomitant injection, it is thus possible to increase the engine performances notably, while remaining far from the rumble risk zone.

More precisely, during the engine intake phase, calculator 56 controls injectors 50 and 54 through control lines 64, 66 in such a way that part of the mass of the gasoline initially injected through injector 50 into pipe 20 is replaced by an injection of VNG through injector 54.

This allows to modify the octane number of the initial fuel mixture and to increase this global octane number of the fuel mixture obtained as a result of the presence of the VNG fuel with a higher RON than the gasoline.

The optimum amount of gas to be injected corresponds to the global octane number required in order to obtain mixing of the two fuels so that the operating point of the engine is at the desired torque, with an ignition advance to the limit of engine knock and generating a maximum pressure angle less than or equal to 35° after the TDC.

This concomitant injection of a second gaseous fuel allows to maintain maximum cylinder pressure angle θ' (see FIG. 2) below threshold value $\theta_{max}$ with the additional advantage of remaining at a fuel/air ratio of 1 for the fuel mixture.

Of course, the person skilled in the art is able to determine the mass proportion of VNG in relation to gasoline required to obtain the desired RON so as to move away from the knock risk zone while remaining within the allowed maximum cylinder pressure angle criteria, thus limiting rumble risks.

This also allows to increase the compression ratio of engines running on gasoline, with all the advantages involved.

Figure 3:
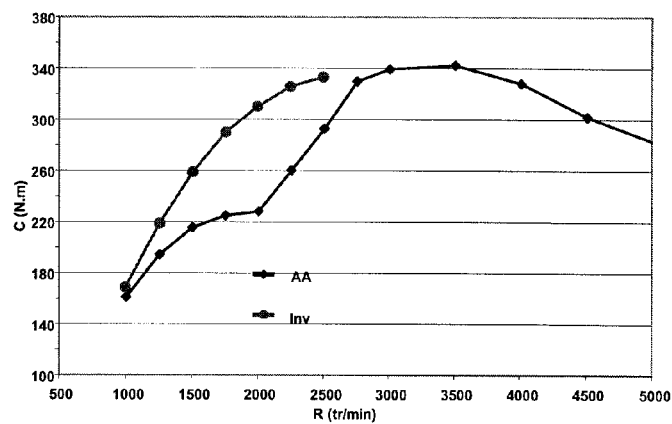
FIG. 3 shows curves representative of the torque (C in N·m) as a function of the engine speed (R in rpm) for a conventional engine and for an engine using the method according to the invention (Inv).

By means of the invention, as can be seen in FIG. 3, the torque obtained with a concomitant VNG injection allows to obtain a higher torque at a lower engine speed (curve Inv) than the torque obtained with an engine of the prior art (curve AA).

The present invention is not limited to the embodiment example described and it encompasses any equivalent or variant covered by the present invention.

The invention claimed is:

1. A method of controlling the combustion phase of a fuel mixture of a spark-ignition supercharged internal-combustion engine, notably of gasoline type, wherein the engine comprises at least one cylinder with a combustion chamber, at least one fuel supply means, at least one intake means, at least one exhaust means and spark ignition means, characterized in that the method comprises, for high loads and low speeds of said engine:
   during the combustion of the fuel mixture, determining a crank angle value (θ') where the maximum cylinder pressure ($P_{max}$) occurs in the combustion chamber,
   comparing the value thus determined with a maximum angle threshold value ($\theta_{max}$) representative of an abnormal combustion in said chamber,
   detecting the start of an abnormal combustion when the determined value reaches said threshold value and when the ignition means are not actuated, and
   feeding an amount of another fuel into the fuel mixture in order to vary the global octane number of this fuel mixture so as to reduce the crank angle where the maximum cylinder pressure occurs.

2. The control method as claimed in claim 1, characterized in that the method comprises increasing the global octane number of the fuel mixture.

3. The control method as claimed in claim 1, characterized in that the method comprising feeding another fuel of gas type into the fuel mixture.

4. The control method as claimed in claim 3, characterized in that the method comprising feeding a gaseous fuel of VNG type.

5. The control method as claimed in claim 1, characterized in that the method comprises preparing the fuel mixture from a liquid fuel.

6. The control method as claimed in claim 5, characterized in that the method comprises preparing the fuel mixture from a gasoline fuel.

7. A method of controlling a combustion phase of a fuel mixture of an internal-combustion engine running at high loads and low speeds, the method comprising:
   determining a crank angle value (θ') of the engine when a maximum cylinder pressure ($P_{max}$) occurs in a combustion chamber of the engine during combustion of the fuel mixture;
   comparing the crank angle value (θ') with a maximum angle threshold value ($\theta_{max}$) representative of an abnormal combustion in the combustion chamber;
   detecting a condition when the crank angle value (θ') reaches the maximum angle threshold value ($\theta_{max}$) before a spark plug fires in the combustion chamber; and
   when the condition occurs, feeding an amount of an additional fuel into the fuel mixture in order to vary the global octane number of the fuel mixture so as to reduce the crank angle where the maximum cylinder pressure occurs.

8. The control method as claimed in claim 7, wherein varying the global octane number of the fuel mixture comprises increasing the global octane number of the fuel mixture.

9. A control method as claimed in claim 7, wherein the additional fuel is of gas type.

10. A control method as claimed in claim 9, wherein the additional fuel is of VNG type.

11. A control method as claimed in claim 7, wherein the method comprises preparing the fuel mixture from a liquid fuel.

12. A control method as claimed in claim 11, wherein the method comprises preparing the fuel mixture from a gasoline fuel.

* * * * *